United States Patent Office 2,717,878
Patented Sept. 13, 1955

2,717,878
SURFACE ACTIVE COMPOSITIONS CONTAINING IMIDES

John David Malkemus, Allendale, N. J., assignor to Colgate-Palmolive Company, a corporation of Delaware No Drawing. Original application May 26, 1949, Serial No. 95,569. Divided and this application June 29, 1951, Serial No. 234,911

13 Claims. (Cl. 252—152)

The invention relates to novel compositions of matter comprising surface-active agents, such as synthetic detergents, emulsizers and wetting agents of the type of sulphated and sulphonated organic materials in admixture with various organic aliphatic imides. This application is a division of copending application Serial No. 95,569, filed May 26, 1949 and now abandoned.

The manner in which these and other features of the invention are attained will appear more fully in the following description thereof in which reference is made to typical and preferred procedures and examples in order to indicate more fully the nature of the invention but without intending in any way to limit the scope of the invention thereby.

In accordance with one phase of the present invention it has been found that the incorporation of a small proportion of surface-active aliphatic imide with a water-soluble, non-soap detergent, emulsifier and wetting agent of the type of sulphated or sulphonated organic materials provides a composition which possesses greatly improved sudsing and foaming properties. Among the surface-active aliphatic imides which may be thus employed, as will be brought out more in detail hereinafter, certain members of the class can be prepared for incorporation as aforesaid or for other purposes, for example, by condensing a suitable nitrogen base with a simple condensation product of a long-chain olefin and an aliphatic acid, ester or anhydride having an alpha-beta-enal group. Other aliphatic imides possessing surface activity and which are suitable for use in preparing novel compositions of matter in accordance with the present invention may be prepared in any suitable manner, for example, by methods which will be pointed out in greater detail hereinafter.

The sulphated or sulphonated organic materials employed in the novel compositions according to the present invention may be prepared from organic materials which are applicable for sulphonation (true "sulphonation" and/or sulphation), especially those having about 8 to about 24 (and preferably about 12 to about 18) carbon atoms to the molecule, including fatty oils, unsaturated fatty acids, mineral oils, mineral oil extracts, mono- and diglycerides, partial esters or ethers of polyglycols, partial esters or ethers of glycols, polyglycols and polyalcohols, aromatic and alkylated aromatic compounds, alcohols and olefins, coal tar distillates, and numerous other organic compounds and mixtures of compounds. Such compounds can be sulphonated by any of several methods and may form any of several products, depending upon the method of sulphonated or sulphated organic compounds include sulphonated mineral oil; conventional mineral oil refinery sludges; sulphonated mineral oil extracts; sulphonated fatty acids and oils, including sulphonated castor oil, sulphoricinoleic acid, sulphonated olive oil, and sulpho-oleic acid, aliphatic sulphonates and sulphates, including cetyl sulphuric acid, diodecyl acid sulphate, sulphates of fatty alcohols derived from fatty acids of vegetable and animal oils and fats, e. g. sodium lauryl sulphate and tetradecanehydroxy sulphonic acid-1,2; aliphatic ether and ester sulphonates including the dodecyl ether of hydroxy ethyl sulphonic acid, the cetyl ether of glyceryl sulphonic acid, and coconut oil monoglyceride monosulphate; sulphonates prepared by treatment of organic materials with sulphur dioxide and chlorine in the presence of light followed by hydrolysis of the product; sulphonates prepared by treatment of organic bodies with sulphuryl chloride and an activating agent in the presence of light followed by hydrolysis of the product; fatty acid amides of amino alkyl sulphonic acids, including lauric amide of taurine and tall oil acid amide of amino glyceryl sulphonic acid; sulphonic acids of naphthenes and naphthenic acids; lignin sulphonic acids; aromatic and alkylated aromatic sulphonic acids, including naphthalene sulphonic acid, octadecyl benzene sulphonic acid, and dodecyl naphthalene sulphonic acid; the product of a mineral oil extract sulphonated while dissolved in liquid sulphur dioxide; and innumerable other organic sulphonic and sulphuric acid derivatives or mixtures thereof. These organic sulphate and true sulphonate compounds include those in which the organic radicals of the molecule are unsubstituted or those which contain substituents, such as halogens, hydroxyls, nitrogen-containing groups, acyl groups, acyloxy groups, alkoxy groups, etc., and they may be used as acids for many purposes but ordinarily the acids are neutralized with an alkaline neutralizing agent to form a water-soluble salt. Suitable neutralizing agents include alkali and alkaline earth metal oxides, hydroxides, carbonates, bicarbonates, such as sodium hydroxide, potassium carbonate, caesium acid carbonate, magnesium oxide, calcium hydroxide, barium carbonate, etc., ammonia and ammonia derivatives, such as methyl amine, diethanol amine, etc. Of these sulphated and sulphonated materials, those having carboxylic ester linkages, including the sodium salts of the sulphuric acid esters of coconut oil fatty acid monoglycerides, tallow diglyceride monosulphate, etc., are particularly suitable.

The aliphatic imides, which may be added to sulphated and/or sulphonated compounds thereby to serve as "organic builders" and to enhance foaming characteristics, include those having one hydrocarbon chain with about 8 to about 24, and preferably about 12 to about 18 carbon atoms, and the hydrogen of the imide group may, if desired, be displaced to form alkylated compounds, as will appear below. The carbon chains of the imide molecule may be straight or branched, saturated or unsaturated, and may be either unsubstituted or substituted by substituents such as halogens, hydroxyls, acyl groups, acyloxy groups, alkoxy groups, aryl groups, etc., although it is generally preferred that any substituent groups that are of a hydrophilic character be located near or adjacent to the imide group. The aliphatic imides of this invention also comprise compounds substituted by cyclic groups having an aliphatic side chain of about 8 to about 24 carbons, although such compounds are not a preferred type. Any one or more of the above compounds may be employed as a component of the novel compositions of the present invention. Furthermore, other compounds which break down or react with the sulphated or sulphonated materials or other constituents of the composition to provide said organic builders also may be employed.

While the organic imides are useful alone or admixed with the above mentioned surface-active agents in all proportions, generally a proportion of the imide ranging from about 0.01% to about 50% of the weight of active ingredients will be used; and it is preferred to incorporate about 0.01% to about 20%, and more preferably about 1% to about 10%, of the organic imide builder based upon the total weight of surface-active ingredients. The optimum proportion employed will vary with the particular active ingredients used; with the proportion of other ingredients present, if any; and to some degree with the strength or concentration of solution to be formed in use.

The organic builder may be incorporated with the other active ingredient to form the novel composition of this invention at any point during the manufacturing process at which subsequet operations will not destroy or objectionably modify the builder or cause a deleterious reaction between the builder and any other material in the composition. In general, it is preferred to add the builder at a point in the manufacturing subsequent to the hydrolyzing and/or neutralizing step. This may be accomplished by adding the organic builder to solutions containing the other active ingredient, by mixing the builder with the solid active ingredient in comminuted form, or by adding the builder to a solution of the active ingredient and thereafter subjecting the solution containing active ingredient and organic builder to spray-drying, roll-drying, etc., to form a solid composition.

Thus the novel compositions provided may be made up in solutions, preferably concentrated, or a dry or partially hydrated solid product may be formed. The product may be made in a more or less finely divided condition, which permits its ready transformation into flakes or other physical forms, for example by passing between a pair of properly spaced rolls, or by pressing into cakes, or by other means, with or without addition of modifying agents.

Adjuvant materials may be admixed with the sulphonate salts by mixing the adjuvant materials with the sulphonated organic compounds and/or the neutralizing agents before neutralization or flashing, by simultaneously flashing a second solution containing such adjuvant materials, and/or by mixing the final product therewith. When added after neutralization, the adjuvant materials may be added before, after, or simultaneously with the organic builder. Such adjuvant material may include any of the substances employed by the art in admixture with sulphonated organic detergents generally, care being exercised to avoid the use of any material which would remove or otherwise substantially diminish the effectiveness of the particular organic builder incorporated. The type of addition agent will depend upon the ultimate use of the new composition.

Suitable imides employed as organic builders include the imides of monocarboxylic acids and of dicarboxylic acids, as well as alkylated imides thereof. Thus compounds of the types:

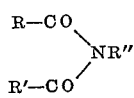

and

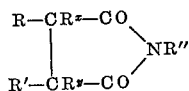

where R is a hydrocarbon radical and R', R'', $R^x$ and $R^y$ may be hydrogen atoms or hydrocarbon radicals, at least one of R, R', R'', $R^x$ and $R^y$ being aliphatic and containing about 8 to about 24, and each of the other hydrocarbon radicals (if any) preferably containing only 1, 2 or 3 carbon atoms.

Myristic acetic imide, lauric acetic N-ethyl imide, dodecyl succinimide, tetradecyl maleic acid imide, imides of anhydrides derived from the ondensation of long-chain olefinic compounds and unsaturated polycarboxylic acids, esters or anhydrides having the alpha-beta-enal group, and the like, are suitable for use as builders.

Imides of monocarboxylic acids, as indicated by the first formula set forth above (or according to another method of terminology, mixed secondary amides) may be made by methods known to the prior art; for example, by heating a primary amide with an acid chloride in benzene solution according to the following equation:

$$R.CO.NH_2 + R'.CO.Cl \rightarrow R.CO.NH.CO.R' + HCl$$

at least one R representing a hydrocarbon radical and the other R representing hydrogen or a different hydrocarbon radical.

Other suitable imides comprise the imides and alkylated imides of alkenyl-substituted polycarboxylic acids derived from the condensation of olefins and olefinic compounds with aliphatic acids, esters and anhydrides having an alpha-beta-enal group. The olefins employed in the condensation are of relatively long carbon chains, having about 8 to about 24 carbon atoms, and they may be aliphatic or alicyclic, straight or branched, mono-olefins or non-conjugated polyolefins, unsubstituted or substituted by non-reactive substituents such as halogens, hydroxyls, carbonyl groups, ether groups, alkyl groups and aryl groups. The aliphatic polycarboxylic acids or anhydrides with which they are condensed are compounds having a double bond between two carbon atoms conjugated with one or more carboxyl groups. Such compounds contain preferably up to about seven carbon atoms per molecule and are preferably compounds of the type of maleic or fumaric acid, itaconic acid, citraconic acid, etc., and their homologs, analogs, esters and anhydrides.

The method of condensation and the condensation product are not parts of the present invention, but it is preferred that a method be employed which results in the formation of a large yield of simple condensation product or that the simple condensation product produced be separated from higher molecular weight complex condensation products. According to a theory advanced in explanation of the results obtained in such condensations, the condensation results in attachment of the olefin to the unsaturated acid (or its ester or anhydride) through one of the double-bond carbons of each compound, with elimination of the double bond of the unsaturated acid and progression of the double bond of the olefin to an adjacent carbon. Thus, according to this theory, the condensation of hexadecene-1 (peroxide-free) and maleic anhydride would proceed in accordance with the following reaction:

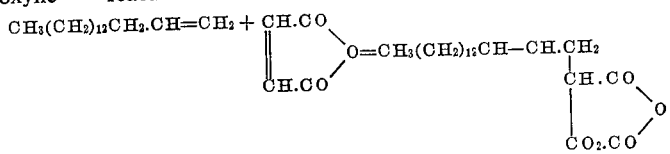

According to one feature of the present invention, the alkenyl-substituted dicarboxylic acid or anhydride thus formed is converted into the corresponding imide by passing substantially dry ammonia gas into the substantially anhydrous molten anhydride at an elevated temperature. The ammonia is passed into the molten anhydride while the latter is at a temperature at least above its melting-point and preferably in excess of 100° C. say at about 130° C., and the temperature is gradually raised while the introduction of the ammonia is continued until no more ammonia is absorbed. This usually takes about an hour, although more time may be consumed if desired, during which time the temperature reaches or may be raised to 150° C. to 200° C. The reaction product, comprising an imide in accordance with the present invention, is then purified by washing. Where the ester of the alkenyl-substituted dicarboxylic acid is to be converted into the corresponding imide, the ester is treated with aqueous ammonia to produce the amide which is then heated to form the imide.

Other nitrogen bases of the type of primary alkyl amines, etc. such as ethyl amine, (n- or iso-)propyl amine and the like, may replace ammonia in the reaction with the anhydride condensation product, thus producing the corresponding N-alkylated product. In carrying out the reaction between the anhydride and an alkyl amine, the amine in the vapor state can be passed through the molten anhydride, or the compounds may be mixed and subjected to elevated temperatures of the order of about 125° C. to about 200° C. If desired, an inert organic solvent can be employed to provide improved admixture of the reactants and to decrease the sensitivity of the reaction so that the degree of condensation may be easier to control. In forming the alkylated imides of the invention, it is preferred to use no more than a stoichiometric amount of the amine, as an excess of the alkyl amine tends to the production of amides rather than of imides.

In any event, in carrying out the reaction between the ammonia or the nitrogen base and the alkenyl-substituted dicarboxylic acid or anhydride, care is taken to carry out the reaction under substantially anhydrous conditions, the water of reaction preferably being removed as it is formed by vaporization from the reaction mixture.

If desired, the reaction product, whether imide or alkylated imide, after purification by lixiviation, may be hydrogenated in known manner to obtain saturated alkyl derivatives.

The imides of the present invention have valuable surface-active properties in admixture with sulphated and/or sulphonated compounds to form the new detergent and wetting compositions described above. These imides are also compatible with fatty acid soaps and may be admixed therewith for desirable results.

The novel and improved synthetic detergents, emulsifiers and/or wetting agents of this invention, comprising sulphated and/or sulphonated organic compounds (with or without adjuvant materials) and a proportion of one or more of the various types of imides described as organic builders herein, produce foams and suds which are more stable, contain more liquid, drain more slowly, are formed of smaller bubbles, and do not so readily break due to evaporation as the foams and suds of similar compositions without the builder. Another advantageous characteristic of the novel detergent compositions of this invention lies in the ability of their aqueous solutions to assimilate a "load" (of dirt, grease, etc.) with greatly decreased foam loss. Many prior art detergent solutions foam very well until a load is added, after which volume and stability of foam are markedly reduced. This effect is largely overcome when employing the "built" detergents of the present invention.

It is a feature of the new compositions that aqueous solutions thereof have decreased wetting times as compared with "unbuilt" compositions which are otherwise quite similar. As will be appreciated, this property is of considerable commercial importance.

The following examples, described hereinafter, are merely illustrative of the present invention, and it will be understood that the invention is not limited thereto.

EXAMPLE I

Part A

Hexadecene-1 is treated with sodium and distilled to remove peroxides. 25 parts by weight of the freshly-distilled peroxide-free hexadecene-1 is then condensed with about 11 parts of maleic anhydride. The condensation is carried out as taught by John Ross and Arthur I. Gebhart in their copending application Serial No. 693,571, filed August 28, 1946, now Patent No. 2,496,358, patented February 7, 1950, and a condensation product largely comprising Δ4,5-octadecene-1,2-dicarboxylic acid anhydride is obtained. The product is distilled to separate this material, which rapidly solidifies upon cooling to room temperature.

The Δ4,5-octadecene-1,2-dicarboxylic acid anhydride is heated to about 130° C., at which temperature it is molten, and dry ammonia gas is bubbled into the molten mass. The temperature is gradually raised at a rate of about 1° C. per minute, and the ammonia is passed into the mass until no more ammonia is absorbed. This takes about an hour, at the end of which period the temperature is approximately 190° C. A solid reaction product comprising in major proportion Δ4,5-octadecene-1,2-dicarboxylic acid imide is formed. This is first washed with dilute hydrochloric acid, then with an aqueous solution of sodium carbonate, and finally with more dilute hydrochloric acid. The imide is crystallized from methanol as glistening white plates, M. P. 82-83° C. The yield obtained is almost the theoretical yield obtainable, based on the anhydride condensation product employed as starting material.

Part B

To an aqueous solution containing about 40% of solids comprising coconut oil fatty acid monoglyceride monosulphate sodium salt and sodium sulphate (in a weight ratio of about 40 parts to about 60 parts, respectively) is added the imide prepared in Part A of this example in an amount equivalent to about 2% by weight of the coconut oil fatty acid monoglyceride monosulphate. The solution is then roll-dried to produce a detersive composition having excellent foaming characteristics in aqueous solution.

Instead of employing ammonia in Part A of Example I above, the corresponding derivatives of methylamine, ethylamine, normal propyl- and isopropylamine may be prepared in like manner by passing the amine in vapor phase into a molten mass of Δ4,5-octadecene-1,2-dicarboxylic acid anhydride. The resulting N-lower-alkyl-substituted imides possess surface-active properties in their own right and when admixed with for example a coconut oil fatty acid monoglyceride monosulphate sodium salt, the resulting composition shows improved foaming and sudsing properties.

EXAMPLE II

One part by weight of lauric acetic imide is added to about 50 parts of a sulphonate prepared by treating a Pennsylvania white mineral oil of paraffin base and having an average molecular weight of 235 with sulphur dioxide and chlorine in the presence of light and neutralizing the product with sodium hydroxide. Sodium sulphate is added, and the ingredients are thoroughly mixed, the resulting detergent composition providing solutions of fine foaming characteristics.

The lauric acetic imide of this example may be prepared in any convenient manner, for example, by heating acetamide and lauroyl chloride in substantially equimolar ration in benzene solution until the evolution of HCl ceases, whereupon the lauric acetic imide may be isolated from the solvent.

EXAMPLE III

The Edeleanu extract of a naphthene base mineral oil is dissolved in about twice its volume of liquid sulphur dioxide and sulphonated with oleum. A dry, fluffy powder is obtained, and this is dissolved in water to form an aqueous solution containing about 20% by weight of the active sulphonated mineral oil extract. An amount of lauryl succinimide equivalent to about 5% of the weight of the active ingredient is stirred into this solution. The solution thus produced has superior foaming characteristics.

The lauryl succinimide employed in this example may be prepared as follows:

Dodecene-1, first treated with sodium and then distilled in order to remove peroxides, is thereafter condensed with a substantially equimolar proportion of maleic anhydride, thereby resulting in Δ4,5-tetradecene-1,2-dicarboxylic acid anhydride. This anhydride is then reacted with dry ammonia gas as in Example I-A above, to give the corresponding imide. This last mentioned product may then be subjected to mild hydrogenation in order to obtain the saturated alkyl derivative, lauryl succinimide, while avoiding reaction at either of the carbonyl groups of the imide nucleus. Suitable conditions for mild hydrogenation include contacting the compound with hydrogen at room temperature and a pressure of about 50 pounds per square inch in the presence of a platinum catalyst, but other pressures, temperatures and catalysts may be used, as those skilled in the art will readily appreciate.

The term "consisting essentially of" as used in the definition of the ingredients present in the composition claimed is intended to exclude the presence of other materials in such amounts as to interfere substantially with the properties and characteristics possessed by the composition set forth but to permit the presence of other materials in such amounts as not substantially to affect said properties and characteristics adversely.

While various specific examples of preferred compositions and methods embodying the present invention have been described above, it will be apparent that many changes and modifications may be made in the methods of procedure, and that a wide variety of specific reagents may be employed in carrying out the procedure. It should therefore be understood that the examples cited and the particular proportions and methods of procedure set forth above are intended to be illustrative only, and are not intended to limit the scope of the invention.

What is claimed is:

1. A detergent composition consisting essentially of an anionic surface-active organic sulphuric reaction product in the form of a water-soluble salt having detergent properties and having in its molecular structure a radical selected from the group consisting of sulphonic acid and sulphuric acid ester radicals, and an amount of an imide as an organic builder up to about 50% by weight of the surface-active ingredients, said imide having the formula:

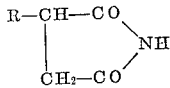

wherein R is an aliphatic hydrocarbon radical containing about 8 to 24 carbon atoms.

2. A detergent composition in accordance with claim 1 wherein R is a higher alkenyl group.
3. A detergent composition in accordance with claim 2 wherein R is octadecene.
4. A detergent composition in accordance with claim 1 wherein R is a higher alkyl group.
5. A detergent composition in accordance with claim 4 wherein R is dodecyl.
6. A detergent composition in accordance with claim 1 wherein R has 12 to 18 carbon atoms.
7. A detergent composition consisting essentially of an anionic surface-active organic sulphuric reaction product in the form of a water-soluble salt having detergent properties and having in its molecular structure a radical selected from the group consisting of sulphonic and sulphuric acid ester radicals, and an amount of an imide as an organic builder up to about 50% by weight of the surface-active ingredients, said imide having the formula:

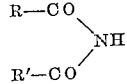

wherein R is an aliphatic hydrocarbon radical of about 8 to 24 carbon atoms and R' is a lower aliphatic hydrocarbon radical.

8. A detergent composition wherein R is a higher alkyl radical.
9. A detergent composition in accordance with claim 8 wherein said imide is myristic acetic imide.
10. A detergent composition in accordance with claim 8 wherein said imide is lauric acetic imide.
11. A composition consisting essentially of a surface-active anionic organic sulphuric reaction product in the form of a water-soluble salt having detersive properties and having in its molecular structure a radical selected from the group consisting of sulphonic acid and sulphuric acid ester radicals, and an imide selected from the group consisting of

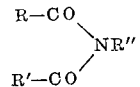

and

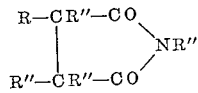

wherein R is an aliphatic hydrocarbon radical of about 8 to about 24 carbon atoms, R' is a lower aliphatic hydrocarbon radical and R" is selected from the group consisting of hydrogen and lower aliphatic hydrocarbon radicals, the amount of said amide being up to about 50% by weight of said surface-active ingredients as an organic builder.

12. A detergent composition in accordance with claim 1 wherein said surface-active organic sulphuric reaction product is water-soluble higher fatty acid monoglyceride monosulphate detergent.

13. A detergent composition in accordance with claim 7 wherein said surface-active organic sulphuric reaction product is water-soluble higher fatty acid monoglyceride monosulphate detergent.

References Cited in the file of this patent

UNITED STATES PATENTS

| 2,182,178 | Pinkernelle | Dec. 5, 1939 |
| 2,383,738 | Richardson | Aug. 28, 1945 |

FOREIGN PATENTS

| 478,308 | Great Britain | Jan. 13, 1938 |